United States Patent [19]

Brinkmeyer

[11] Patent Number: 4,957,365

[45] Date of Patent: Sep. 18, 1990

[54] OPTICAL, METER WITH DUAL FUNCTIONS AVALANCHE PHOTODIODE

[75] Inventor: Ernst Brinkmeyer, Buchholz, Fed. Rep. of Germany

[73] Assignee: U.S. Philips Corp., New York, N.Y.

[21] Appl. No.: 283,413

[22] Filed: Dec. 12, 1988

[30] Foreign Application Priority Data

Dec. 23, 1987 [DE] Fed. Rep. of Germany ....... 3743678

[51] Int. Cl.$^5$ .................. G01N 21/88; G01C 3/08
[52] U.S. Cl. ........................... 356/73.1; 356/5
[58] Field of Search ...................... 356/73.1, 5

[56] References Cited

U.S. PATENT DOCUMENTS 4,320,968  3/1982  Wakabayashi ............... 356/73.1

Primary Examiner—Vincent P. McGraw

[57] ABSTRACT

An optical backscattering meter includes an optical transmitter whose transmission power is modulated (wobbled) with a variable frequency via an oscillator and whose transmission beam is coupled into a light wave cable (LWL) via a beam splitter. It further includes an optical receiver including an avalanche photodiode, to which receiver are applied, via the beam splitter, portions of the transmission beam that are scattered back from the light wave cable (LWL). A mixing signal is formed from a signal proportional to the optical backscattering power and a modulation voltage having the oscillator frequency and is evaluated for determining the location of the backscattering and the intensity thereof. The cost of the optical receiver is reduced by the use of the avalanche photodiode (4), whose bias voltage is a d.c. voltage ($U_G$) modulated by the modulation voltage ($U_M$), and because the mixing signal ($U_P$) can be tapped at a parallel circuit comprising an ohmic resistor $R_P$ and a capacitor ($C_R$) inserted in the energizing circuit of the photodiode.

20 Claims, 1 Drawing Sheet

OPTICAL, METER WITH DUAL FUNCTIONS AVALANCHE PHOTODIODE

BACKGROUND OF THE INVENTION

This invention relates to an optical backscattering meter including an optical transmitter whose transmission power is modulated (wobbled) with a variable frequency via an oscillator and whose transmission beam is led into a light wave cable (LWL) via a beam splitter, and including an optical receiver arranged as a photodiode, to which receiver are applied via the beam splitter portions of the transmission beam that are scattered back from the light wave cable (LWL) and in which a mixing signal is formed from a signal proportional to the optical backscattering power and a modulation voltage having the oscillator frequency and is evaluated for determining the location of the backscattering and the intensity of the backscattering.

In such an arrangement, known from the U.S. Pat. No. 4,320,968 (3/23/82), electrical output signal of the photodiode and the oscillator signal are together applied to a mixer to form the mixing signal. Since high modulation frequencies are required, a very "fast" and consequently costly detecting circuit is necessary.

SUMMARY OF THE INVENTION

It is an object of the invention to reduce the cost of the optical receiver.

The solution is successful because the photodiode is an avalanche photodiode, whose bias voltage is a d.c. voltage modulated by the modulation voltage, and because the mixing signal is tapped at a parallel circuit comprising an ohmic resistor $R_p$ and a capacitor $C_p$, which circuit is inserted in the energizing circuit of the photodiode.

No additional mixer is necessary for the device according to the invention, because the mixing also is effected by the avalanche photodiode, whereas the mixing signal is tapped at a preceding parallel circuit comprising an ohmic resistor and a capacitor.

In addition, it is advantageous that the ratio of mixing frequency to modulation frequency be smaller than $0.5 \cdot 10^{-3}$. With larger ratios it is more difficult to separate the mixing signal from the modulation-frequency voltage. In this connection the ohmic resistance $R_p$ is preferably larger than 10 times, preferably 20 times the impedance related to the minimum value of the modulation frequency and is smaller than 0.05 times, preferably 0.035 times the impedance related to the mixing frequency of the capacitor $C_p$.

Furthermore, there is a good signal yield because the impedance of the series circuit of the capacitor $C_p$ and the self-capacitance $C_D$ of the photodiode, occurring at the maximum value of the modulation frequency, exceeds 10 times, preferably 20 times the d.c. internal resistance $R_i$ of the energizing circuit of the photodiode.

The light scattered back by a particular location of backscattering along the path of the examined light wave cable (LWL) can be captured by passing the mixing signal through a band-pass filter and by predetermining shift frequencies $\Delta\Omega$ which correspond to the distance of the backscattering location to be considered. However, shorter measuring times are possible because the mixing signal is simultaneously passed through a plurality of band-pass filters having different pass frequencies, so that a plurality of interspaced backscattering locations can be measured simultaneously.

According to an advantageous alternative it is likewise possible, in lieu of using band-pass filters, to supply the mixing signals to a circuit for a Fourier transform. In this way, the measuring time can be reduced to a minimum.

BRIEF DESCRIPTION OF THE DRAWING

The invention and its advantages will be further explained with reference to the description of an advantageous embodiment represented in the accompanying drawing, in which.

DESCRIPTION OF THE PREFERRED EMBODIMENTS

The transmission beam of laser diode 1 is led into the light wave cable (LWL) 3 to be measured, via the beam splitter 2. Portions of the transmission beam scattered back from the light wave cable (LWL) 3 are directed to the receiver diode (APD) 4 by the beam splitter 2. The oscillator 5 signal, which has a variable frequency, wobbles the light intensity of the laser diode 1 and is also used to form a mixing signal in the receive and evaluation arrangement 6.

Figure 1:
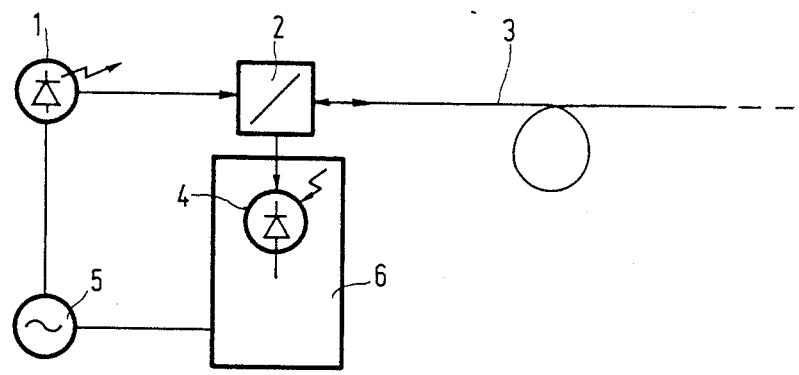
FIG. 1 shows a block diagram of a backscattering meter according to the invention.
Figure 2:
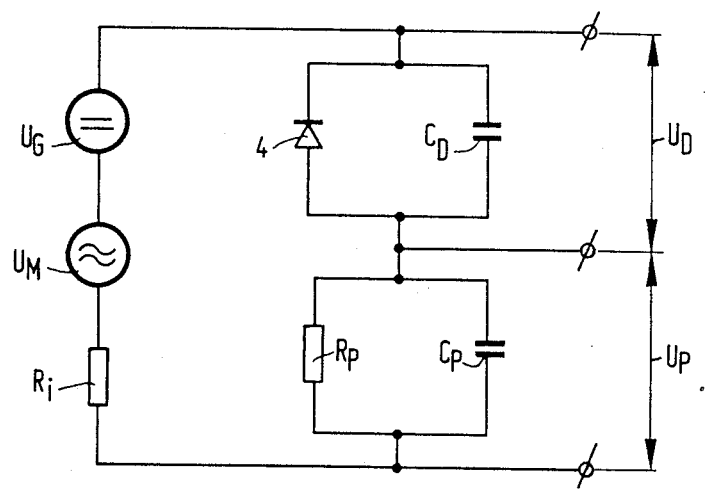
FIG. 2 shows the electrical energizing circuit according to the invention of the photodiode as shown in FIG. 1.

According to FIG. 2 a parallel circuit comprising an ohmic resistor $R_p$ and a capacitor $C_p$ is connected in series with the APD 4, which has a self-capacitance $C_D$. The sum voltage of the d.c. voltage $U_G$ and the modulation voltage $U_M$, proportional to the signal from oscillator 5 is applied to the series circuit. The internal resistance of the two voltage sources is designated as $R_i$.

The laser diode 1 is modulated and wobbled in a period of time T by means of the oscillator 5 having the frequency $f_o$ to $f_{max}$. The power of the transmission beam is then changed according to the following equation:

$$P(t) = \bar{P}\left[1 + m_L \cos\left(Q_o t + \frac{\gamma}{2} t^2\right)\right]$$

From a random disturbance source of the light wave cable (LWL) 3 within the distance z (or from a backscattering linear section) a power $P_s(t)$ arrives at the APD 4 delayed by $\tau = 2z/v_g$ and having a weaker intensity:

$$P_s(t) = rP(t - \tau) =$$

$$r \cdot \bar{P}\left[1 + m_L \cos\left(Q_o(t - \tau) + \frac{\gamma}{2} t^2 - \gamma\tau t + \frac{\gamma}{2} \tau^2\right)\right].$$

When mixing the signals with the frequencies of the APD input signal and the instantaneous energizing signal for the laser diode, a mixing term will occur having the frequency $8\tau/2\pi$. Its amplitude is proportional to the reflected power and its frequency is a measure of the kind of reflection.

In accordance with the invention, according to FIG. 2, the bias voltage of the APD is high-frequency modulated by a signal derived from the laser diode energizing circuit.

Thus, the APD is simultaneously used for receiving and mixing.

The components of the circuit as shown in FIG. 2 were proportioned in consideration of the following requirements:

within the range of the modulation frequencies [$f_o$, $f_{max}$] the resistance is to be $R_p >> 1/\omega C_p$.

within the range [$f_o$, $f_{max}$], $|U_D/U_M|$ is to be $\geq 0.7$ within the range [$f_o$, $f_{max}$], $\omega R_i (1/C_p + 1/C_D)^{-1}$ is to be $<0.1$ within the range of the mixing frequency $\Delta f$ of the mixing signal $U_p$, $R_p$ is to be $<< 1/\omega C_p$.

These requirements were satisfied with the following values:

$C_D = 0.5$ pF, $C_p = 1.5$ pF, $R_i = 50$ Ω, $R_p = 300$ kΩ with $f_o = 10$ MHz; $f_{max} = 500$ MHz;

These values result in:

$R_p/(1/\omega C_p) > 28$ within the range [$f_o$, $f_{max}$]

$|U_D/U_M| = 0.75$ within the range [$f_o$, $f_{max}$]

$\omega R_i(1/C_p + 1/C_D)^{-1} < 0.06$ within the range [$f_o$, $f_{max}$]

$R_p/(1/\omega C_p) < 0.028$ for $\Delta f = 10$ kHz.

This proportioning guarantees that the modulation voltage, having a low-ohmic condition, is applied to the APD, whereas for the signals having the mixing frequency $\Delta f$ the resistor $R_p$ acts as a conversion resistor and can be selected to have a large value.

If the energizing voltage of the laser diode is shifted in accurately known values by small frequencies $\Delta\Omega$ by means of the oscillator 5, in a first approximation of the avalanche amplification M of the APD 4 one attains:

$$M(t) = M_0 \left[ 1 + m_A \cos\left( (Q_0 + \Delta Q)t + \frac{\gamma}{2} t^2 \right) \right]$$

With the receive power $P_s(t)$ the photocurrent $i_{ph}(t)$ leads to:

$$i_{ph}(t) = S \cdot M(t) \cdot P_s(t)$$
$$= S \cdot R\bar{P}M_o \left\{ \tfrac{1}{2} m_A \cdot m_2 \cos\left[ (\gamma\tau + \Delta Q)t + Q_o\tau - \frac{\gamma}{2}\tau^2 \right] + 1 \right\}$$

If a fixed frequency $\Omega_D$ is detected with a filter, an assigned line section situated at a distance z (corresponding to a time delay $\tau$) can be considered by selecting the frequency shift $\Delta\Omega$:

$$\Omega_D = \gamma\tau + \Delta\Omega$$

or $$\tau = (\Omega_D - \Delta\Omega)/\gamma.$$

If the bandwidth $\Delta\Omega_D$ of the filter is selected such that $$\Delta Q_D = \frac{f_{max} - f_o}{\gamma},$$

there will be a solution for $\Delta\tau$:

$$\Delta\tau = \frac{1}{f_{max} - f_o}$$

Accordingly, the solution with respect to the location of the backscattering is:

$$\Delta z = v_g \Delta\tau/2 = \frac{v_g}{2(f_{max} - f_o)},$$

where $v_g$ is the velocity of light in the light wave cable LWL.

The solution with respect to this location is thus determined by the overall continous frequency range. For the above example with ($f_{max} - f_o$) being approximately 500 MHz, the result is $\Delta z = 20$ cm.

With a 1 km line length, and with the solution of $\Delta z = 20$ cm, $N = 5000$ measuring points can be included. For attaining an acceptable overall measuring time N T, a time period T of approximately 1 sec may to be chosen.

For a reduction of the measuring time it is possible to perform a simultaneous evaluation of the different frequencies with a plurality of filters. When using 10 filters a reduction of the measuring time by a factor of 10 can be attained.

In lieu of the described evaluation through fixed detection filters and frequency shifts, the mixing signal also can be sampled, that is to say, for the selected example according to FIG. 2, at 10 kHz. After the measuring period T the sample values are subjected to a fast Fourier transform. So doing, a very short overall measuring period is attainable.

I claim:

1. An optical backscattering meter arrangement comprising: an optical transmitter/whose transmission power is modulated (swept) with a variable frequency via an oscillator and whose transmission beam is applied to a light wave cable (LWL) via a beam splitter, an avalanche photodiode optical receiver, to which optical receiver are applied, via the beam splitter, portions of the transmission beam that are scattered back from the light wave cable (LWL), wherein a mixing signal is formed in the optical receiver from a signal proportional to the optical backscattering power and a modulation voltage having the oscillator frequency, means for evaluating said mixing signal for determining the location of the backscattering and the intensity of the backscattering, means for applying to the avalanche photodiode a bias voltage including a d.c. voltage ($U_G$) modulated by the modulation voltage ($U_M$), and wherein the mixing signal ($U_p$) is tapped at a parallel circuit comprising an ohmic resistor ($R_p$) and a capacitor ($C_p$) inserted in an energizing circuit of the photodiode.

2. An arrangement as claimed in claim 1, wherein the ratio of mixing frequency ($\Delta f$) to modulation frequency ($f_M$) is less than $0.5 \cdot 10^{-3}$.

3. An arrangement as claimed in claim 1, wherein the d.c. resistance of the ohmic resistor ($R_p$) exceeds 10 times the impedance of the capacitor ($C_p$) relating to the minimum value ($f_o$) of the modulation frequency and is less than 0.05 times the impedance of the capacitor ($C_p$) relating to the mixing frequency ($\Delta f$).

4. An arrangement as claimed in claim 3, wherein the impedance of a series arrangement comprising the capacitor ($C_p$) and a self-capacitance ($C_D$) of the photodiode, which occurs at the maximum value $f_{max}$ of the modulation frequency, exceeds 10 times an ohmic internal resistance ($R_i$) of the energizing circuit of the avalanche photodiode.

5. An arrangement as claimed in claim 1, wherein the optical transmitter includes a laser diode and an energizing voltage for the laser diode is frequency-shifted by small amounts with respect to the modulation voltage.

6. An arrangement as claimed in claim 5, wherein the mixing signal is passed through a band-pass filter.

7. An arrangement as claimed in claim 5, wherein the mixing signal ($U_p$) is simultaneously passed through a plurality of band-pass filters having different pass frequencies.

8. An arrangement as claimed in claim 1, wherein the mixing signal ($U_p$) is applied to a circuit for a Fourier transform.

9. An arrangement as claimed in claim 2, wherein the d.c. resistance of the ohmic resistor ($R_p$) is at least 10 times the impedance of the capacitor ($C_p$) relating to the minimum value ($f_o$) of the modulation frequency and is less than 0.05 times the impedance of the capacitor ($C_p$) relating to the mixing frequency ($\Delta f$).

10. An arrangement as claimed in claim 1, wherein the impedance of a series arrangement comprising the capacitor ($C_p$) and a self-capacitance ($C_D$) of the photodiode, which occurs at the maximum value ($f_{max}$) of the modulation frequency, exceeds 10 times an ohmic internal resistance ($R_i$) of the energizing circuit of the avalanche photodiode.

11. An arrangement as claimed in claim 2, wherein the optical transmitter includes a laser diode and an energizing voltage for the laser diode is frequency-shifted by small amounts with respect to the modulation voltage.

12. An arrangement as claimed in claim 4, wherein the mixing signal ($U_p$) is applied to a circuit for a Fourier transform.

13. An arrangement as claimed in claim 1, wherein the d.c. resistance of the ohmic resistor ($R_p$) is at least 20 times the impedance of the capacitor ($C_p$) at the minimum value ($f_o$) of the modulation frequency and is less than 0.035 times the impedance of the capacitor ($C_p$) at the mixing frequency ($\Delta f$).

14. An arrangement as claimed in claim 2, wherein the impedance of a series arrangement comprising the capacitor ($C_p$) and a self-capacitance ($C_D$) of the photodiode at the maximum value of the modulation frequency ($f_{max}$) is at least 20 times an internal resistance ($R_i$) of the energizing circuit of the avalanche photodiode.

15. An arrangement as claimed in claim 2, wherein the d.c. resistance of the ohmic resistor ($R_p$) is at least 20 times the impedance of the capacitor ($C_p$) at the minimum value ($f_o$) of the modulation frequency and is less than 0.035 times the impedance of the capacitor ($C_p$) at the mixing frequency ($\Delta f$).

16. An arrangement as claimed in claim 2, wherein the impedance of a series arrangement of the capacitor ($C_p$) and a self-capacitance ($C_D$) of the photodiode at the maximum value of the modulation frequency ($f_{max}$) is at least 10 times an ohmic internal resistance ($R_i$) of the energizing circuit of the avalanche photodiode.

17. An optical meter comprising:
means for generating a light beam,
a variable frequency oscillator coupled to said light generating means for modulating the light output thereof with a variable frequency,
means including a beam splitter for supplying a modulated light beam to an optical transmission line,
an avalanche photodiode optically coupled to said beam splitter to receive therefrom light reflected back from said optical transmission line,
a parallel circuit comprising a resistor and a capacitor,
a source of d.c. bias voltage,
means including said parallel circuit for coupling said d.c. bias voltage source and said oscillator to said avalanche photodiode thereby to apply to said photodiode a d.c. bias voltage modulated by a modulation voltage of said oscillator, and wherein
a mixing signal is developed across said parallel circuit determined by the reflected light received by the photodiode and by said modulated d.c. bias voltage, and
means for supplying said mixing signal means for determining the intensity of the reflected light and the location of a point in said optical transmission line from which the reflected light emanates.

18. An optical meter as claimed in claim 17 wherein:
said light generating means comprises a laser diode,
the ratio of mixing frequency to modulation frequency is less than $0.5 \cdot 10^{-3}$, and
the resistance of said resistor is at least 10 times the impedance of the capacitor at the lowest value of the modulation frequency ($f_o$) and is less than 0.05 times the impedance of the capacitor at the mixing frequency.

19. An optical meter as claimed in claim 17 wherein:
said parallel circuit and said photodiode are connected in a series circuit and said photodiode has an inherent capacitance in series with said capacitor,
means coupling said series circuit to an energizing circuit including said source of d.c. bias voltage and said oscillator, and wherein
the impedance of the series arrangement of the capacitor and said inherent capacitance at the maximum value of the modulation frequency ($f_{max}$) is at least 10 times an internal resistance ($R_i$) of the energizing circuit.

20. An optical meter as claimed in claim 19 wherein the ratio of mixing frequency to modulation frequency is less than $0.5 \cdot 10^{-3}$.

* * * * *

UNITED STATES PATENT AND TRADEMARK OFFICE
CERTIFICATE OF CORRECTION

PATENT NO.   : 4,957,365
DATED        : September 18, 1990
INVENTOR(S)  : ERNST BRINKMEYER It is certified that error appears in the above-identified patent and that said Letters Patent is hereby corrected as shown below:

ON THE TITLE PAGE:

On the title page item [54] and in column 1, line 1, change "FUNCTIONS" to --FUNCTION--.

IN THE ABSTRACT:

line 19, before "R" insert --(--.

IN THE CLAIMS:

Claim 1, column 4, line 36, after "transmitter" delete "/".

Claim 17, column 6, line 32, after "signal" insert --to--.

Signed and Sealed this

Third Day of March, 1992

Attest:

HARRY F. MANBECK, JR.

*Attesting Officer*   *Commissioner of Patents and Trademarks*